Nov. 17, 1936.                         C. F. KIECH                        2,061,197
                    METHOD AND APPARATUS FOR TREATING EMULSIONS
                              Filed Oct. 2, 1933            2 Sheets-Sheet 1
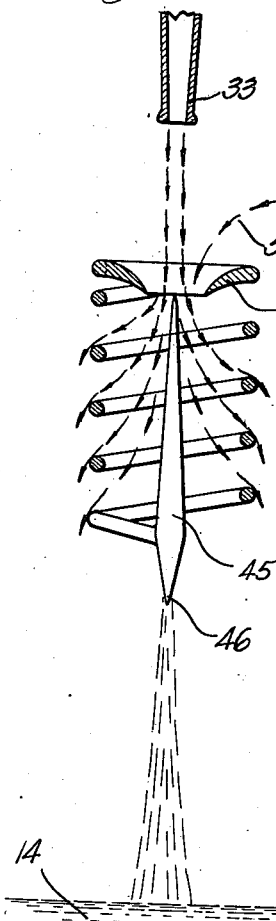
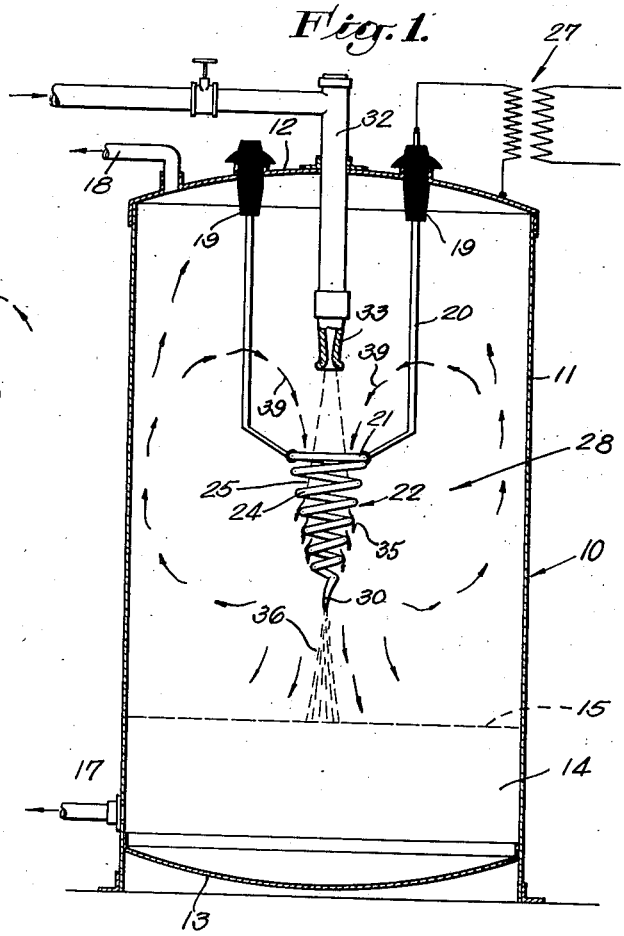
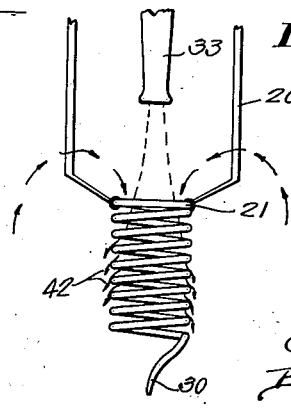
INVENTOR:
CLARENCE F. KIECH.
By Fad W Laun
ATTORNEY.

Nov. 17, 1936.  C. F. KIECH  2,061,197
METHOD AND APPARATUS FOR TREATING EMULSIONS
Filed Oct. 2, 1933    2 Sheets-Sheet 2

INVENTOR:
CLARENCE F. KIECH,
By
ATTORNEY.

Patented Nov. 17, 1936

2,061,197

UNITED STATES PATENT OFFICE 2,061,197

METHOD AND APPARATUS FOR TREATING EMULSIONS

Clarence F. Kiech, Los Angeles, Calif., assignor to Petroleum Rectifying Company of California, Los Angeles, Calif., a corporation of California Application October 2, 1933, Serial No. 691,807

22 Claims. (Cl. 204—24)

My invention relates to a novel method and apparatus for treating petroleum emulsions or other mixtures. While the invention will be particularly described in its application to the field of electric dehydration of petroleum emulsions, it will be clear that certain of the features herein shown are not limited thereto.

In the electric dehydration of such emulsions an electric field alternating character is impressed across a body of the emulsion. The action of this field tends to coalesce the dispersed phase into masses of sufficient size to gravitationally separate from the remaining constituents. In the usual crude petroleum emulsion this dispersed phase is in the form of minute drops of water suspended in a continuous phase of oil.

The rate at which this coalescence takes place is dependent upon the intensity of the field. As disclosed in the patent to Harmon F. Fisher, No. 1,838,924, superior results are obtained when the electric field is built up between a small central electrode and a relatively larger surrounding electrode, due to the fact that with such an electrode structure the field is highly concentrated adjacent the central electrode. It has been found that most of the treating takes place in this more intense portion of the field, and it is one of the objects of the present invention to provide a novel method and apparatus for introducing emulsion or other liquid into the most intense portion of an electric field.

It is often desirable to utilize the small central electrode as the live electrode. With such an electrode structure the problem of bringing the emulsion into the most intense portion of the field is a difficult one and usually necessitates the use of a tank maintained at high potential and discharging immediately around the central electrode. Such a fluid introduction system is not only cumbersome and expensive, but represents such a hazard to operators that it is seldom used. It is an object of the present invention to provide a novel method and apparatus for introducing the emulsion by providing a substantially equipotential space into which the emulsion is introduced prior to the time that it reaches the field.

A further object of the invention is to provide an interstitial electrode defining such an equipotential space, the emulsion moving outward through the interstices and into the field.

In its preferred form such an electrode may take the shape of an elongated coil spring so that when emulsion is moved into the interior thereof this emulsion flows outward between the coils and directly into the very intense portion of the field immediately adjacent the outside of these coils. In the preferred embodiment this electrode may be in the shape of a conical coil spring. Each of these forms is included among the objects of the present invention.

Another object of the invention is to provide an electrode structure of interstitial character with which is associated a novel emulsion spreader which causes the emulsion to flow through the interstices, while another feature of the present invention lies in a novel collar through which the emulsion is introduced into the equipotential space defined by the interstitial electrode.

Still another object of the invention lies in the utilization of such an interstitial electrode with a terminal portion disposed on the lower end thereof and spaced above a body of water in the tank whereby an intense electric blast is set up between this terminal portion of the interstitial electrode and the body of water.

When using a small rod-like electrode in conjunction with a surrounding electrode, it is often desirable to make the electrode of such size that it is easily flexed. This is true regardless of whether the electrode is in the form of a straight rod or is bent in a curved shape. By suitably directing the incoming emulsion against such a resilient rod-like electrode this electrode will be set into rapid vibration. This vibration in reality increases the effective area of the most intense portion of the field and thus increases the size of the effective treating space. If the rod-like electrode provides a terminal portion adjacent which an intense electric blast is set up, vibration of this terminal portion will greatly increase the effective area covered by the blast and thus increase the treating action. In addition, the rapid vibration of such a rod-like electrode tends to shake off the agglomerated water masses which have accumulated in the intense portion of the field thereadjacent. When these masses leave the electrode surface they are electrically charged and serve to facilitate coalescence as they drop downward in the treater. Finally, the rapid vibration of such a rod-like electrode tends to disrupt any short-circuiting chains which may form in the field. Thus, one of the important objects of the present invention is to vibrate such a rod-like electrode to accomplish these desirable ends.

Still a further object of the present invention is to utilize a plurality of electrodes each in the form of an elongated coil spring, these electrodes having a common axis, and to impress a potential difference therebetween.

Further objects and advantages of the invention will be made evident hereinafter.

Referring to the drawings, in which several embodiments of the invention are diagrammatically illustrated, Fig. 1 is a vertical sectional view of one form of dehydrator including the features of the present invention;

Figs. 2 and 3 are fragmentary views of alternative electrode structures falling within the scope of the present invention;

Figure 4:
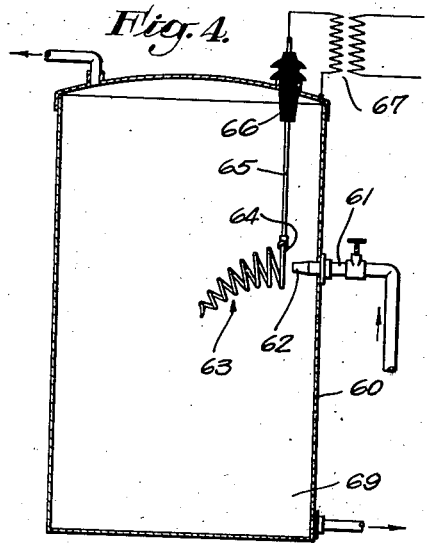
Fig. 4 is an alternative form of the invention, the electrode being illustrated in the position it assumes when no emulsion is being supplied to the treater.

Referring particularly to Fig. 1, the treater of my invention includes a tank 10 formed of a shell 11 closed at its upper and lower ends by heads 12 and 13, respectively. The lower end of this shell preferably contains a body of water 14, the surface of which is indicated by the dotted line 15, while the upper end of the tank contains a body of dry oil. Pipes 17 and 18, respectively, withdraw water and oil from the lower and upper ends of the tank.

Mounted in the upper head 12 are two or more insulators 19, each of which supports a rod 20 extending downward in the tank 10. The lower ends of these rods are bent inward and retain a ring 21 which, in this form of the invention, is concentric with the vertical axis of the tank 10.

A central live electrode 22 is supported by the ring 21. This electrode may be in the form of an interstitial member. In the preferred embodiment this member takes the form of a rod-like electrode bent into the shape of an elongated coil spring, the coils being indicated, for instance, by the numeral 24, adjacent coils being separated by a space 25. Such an electrode in the shape of an elongated coil spring may be in the form shown in Fig. 2 wherein all of the coils are of substantially the same diameter, or it may be in the shape of a conical coil spring such as illustrated in Fig. 1, in which successively lower coils are of decreasing size.

A potential difference is maintained between the live electrode 22 and the tank 10 by any suitable means such as a transformer 27. As illustrated, the high-tension winding of this transformer provides two terminals, one of which is grounded to the tank 10 and the other of which is electrically connected through one of the rods 20 to the electrode 22. When this transformer is energized an electric field is set up in a space 28 between the periphery of the electrode 22 and the tank 10. It will be clear, however, that due to the relatively small size of the rod-like material used in making the electrode 22 as compared with the diameter of the tank 10, this electric field will be highly concentrated adjacent the outer portions of the coils. Stated in other words, the field will radiate from these outer portions toward the tank 10, and the field intensity adjacent any such portion will be very much higher than the field intensity immediately inside the tank 10. These field relationships do not differ materially from the relationships which would be set up if the rod-like material was not bent in the form of a coil spring but was extended vertically in the tank 10. One particular advantage in bending this rod-like material in the form of a coil spring lies in the fact that a much greater length of this rod-like material can be utilized so that the field is much more extensive than would be the case if a single vertically-extending rod-like electrode were utilized.

In some instances it is desirable to form a lower terminal portion 30 on the lower end of such an elongated coil spring. If desired the lower end of this terminal portion may be in the shape of a sharp point, though this is not always necessary. It is, however, desirable to so form the terminal portion 30 that a very intense field is set up thereadjacent. This field will be in the form of an intense downwardly-directed electric blast taking place toward the body of water 14, and is set up due to the difference in potential between the terminal portion 30 and this body of water which is, of course, electrically connected to the tank 10.

The emulsion to be treated is introduced into the tank 10 through a pipe 32 and is discharged in the form of a downwardly-moving stream directed axially into the elongated coil spring electrode. It is usually preferable to utilize a nozzle 33 secured to the pipe 32 for forming such a stream. Due to the shape of the live electrode 22 the space therein is of substantially equipotential nature, this space being bounded by the coils of the electrode. The emulsion moves downward into this substantially equipotential space and flows therefrom through the spaces 25 between adjacent coils 24. It will be clear then that the emulsion is first moved into this substantially equipotential space and is then moved directly into the most intense portion of the electric field in the space 28. The flow of emulsion is substantially transverse to the coils of the electrode 22, as indicated by the arrows 35. It thus moves substantially transversely across the most intense portions of the field. Further, considering the portion of the emulsion moving as indicated by the arrow 35, this portion of the emulsion will not only be treated by the very intense field adjacent the periphery of the coil nearest this arrow, but will later move downward and across the field set up between the next lower coil and the tank. In this way any portion of the emulsion is successively treated as it moves downwardly in the space 28.

The treating action which takes place is a coalescence of the dispersed phase, this dispersed phase usually being in the form of minute water particles. When such minute particles are coalesced by the electric fields they are formed into masses of sufficient size to gravitate from the remaining constituent and thus drop downward toward the body of water 14. The very intense electric blast indicated by the numeral 36 and taking place from the terminal portion 30 acts to assist these water particles in their downward movement, projecting such water masses violently toward and into the body of water 14. In addition, any emulsion which reaches the vicinity of this blast without being sufficiently treated will be electrically treated while in the blast. The dry oil, on the other hand, being lighter than the water, tends to rise in the tank 10, as indicated by the arrows 37, and eventually reaches the upper end of the tank where it can be withdrawn by means of the pipe 18.

In starting the treater it is usually preferable to fill the space above the body of water 14 with dry oil, but if the treater has been in operation for a time, it will be clear that the water content of the liquid in the tank will gradually decrease toward the upper end. It is usually preferable to operate the treater so that the material adjacent the upper end of the electrode 22, and the material surrounding the nozzle 33, is of a dielectric nature. This prevents any tendency for low resistance paths to be formed between the nozzle and the ring 21. This dielectric material also serves another desirable purpose. The incoming stream of emulsion discharged from the nozzle 33 acts to withdraw a portion of this dry oil into the equipotential space as the emulsion moves thereinto, this flow of dielectric oil being indicated by the arrows 39. This dielectric oil completely fills the gap between the nozzle 33 and the ring 21, and thus prevents current flow therebetween. Even if a nozzle were used which so diverges the stream as to come in contact with the ring 21 the dielectric oil will still be drawn into the outer portion of the space bounded by this ring and would thus reduce current flow between the nozzle and ring to a minimum. In either event the dielectric becomes intermixed with the outer portion of the stream of incoming emulsion and serves to facilitate treatment when the emulsion is moved into the most intense portions of the field.

The form of live electrode 22 illustrated in Fig. 1 is particularly valuable in view of the fact that successively lower coils are of smaller size. Thus, even if the stream of emulsion leaving the nozzle 33 did not materially diverge during its passage through the substantially equipotential space, it will be clear that the emulsion will be forced outward through the space between adjacent coils due to the fact that the successively lower coils are of smaller diameter, the lowermost coil being quite small, as shown. However, it is possible to successfully use an electrode of a shape illustrated in Fig. 2 wherein all of the coils are of substantially the same diameter. With such an electrode, however, it is preferable to utilize a nozzle 33 which discharges a stream of emulsion of diverging character. Such a diverging stream will force the emulsion outward between the adjacent coils and thus through the most intense portion of the field, as indicated by the arrows 42 of Fig. 2. Any of the emulsion which is not forced outward between these coils will move downward into the electric blast set up below the terminal 30 and will be treated therein.

In Fig. 3 I have illustrated a slightly different form of electrode structure which sometimes can be used to advantage. In this form I utilize an elongated coil spring electrode similar to that shown in Fig. 2, but provide a vertically extending member 45 extending upward from the lowermost coil in a centrally disposed position with regard to the substantially equipotential space inside the electrode. The upper end of this member is preferably pointed, as shown, and may terminate at any desired level in the substantially equipotential space. In the form shown the member 45 terminates near the upper end of this space. The stream of emulsion moving downward from the nozzle is spread by this pointed member. By making this member sufficiently tapered, it will act as a spreading means for moving the emulsion outward through the spaces between adjacent coils, as indicated by the arrows of Fig. 3. The degree of taper can be readily determined empirically. Usually this taper need be only very slight, and in some instances the taper need be only at the upward directed point itself, the remainder of this member being of substantially constant diameter.

In this form of the invention it is preferable, though not always necessary, to provide a lower terminal portion 46 on the member 45. Thus an electric blast will be set up below this terminal portion 46 and toward the body of water 14 therebelow. Any of the emulsion which flows in an untreated state along the member 45 will thus be discharged from the terminal portion and into the electric blast where treatment will be effected. If desired, the spring-shaped electrode may be dispensed with, relying upon the treatment in the blast for separating the constituents.

It is also possible by properly proportioning the elements to effect a treating action between the nozzle 33 and the upper point of the member 45, utilizing this treating action in addition to the treating action or fluid-removing action of the blast below the terminal portion 46. The electrode structure wherein treatment takes place from a nozzle to a point adjacent which the nozzle is directed is not per se a part of the present invention, being disclosed in the patent to Harold C. Eddy, et al., No. 1,838,917. The relationship herein shown whereby the emulsion moves downward along the vertically extending member 45 and from the terminal portion into an intense electric blast set up to a body of water is, however, new. During the downward movement along the member 45 at least some of the dry oil can leave the vicinity of this member and rise in the tank 10. If an electrode of coil-shape is utilized, this separated oil will be subjected to a further treatment.

In Fig. 3 I have also illustrated another variation of the electrode system shown in Figs. 1 and 2. This feature is in the form of a collar 50 extending inwardly from the ring 21, or itself comprising this ring. This collar extends inward and downward so as to guide the emulsion centrally thereinto and also to guide the flow of dielectric material, as indicated by the arrows 51 of Fig. 3, so that this material will flow inward toward the center of the equipotential space. This collar is preferably made of metal and also serves to further shield the space inside the coil-shaped electrode from any electric fields. Such a collar may be used in conjunction with the electrodes shown in Figs. 1 and 2, if desired, and is not limited in utility to the electrode structure including the vertically extending member 45.

Figure 5:
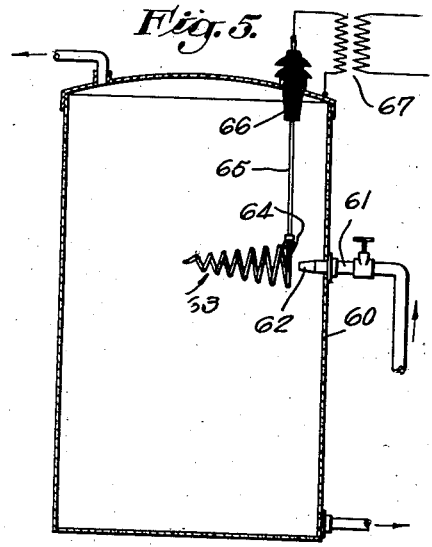
Fig. 5 represents the same treater as shown in Fig. 4 and illustrates the electrode in its operating position.

In Fig. 4 I have illustrated an alternative form of the invention in which the emulsion is introduced horizontally into a tank 60 through a pipe 61 and a nozzle 62. In this form of the invention an electrode of the elongated coil spring type is utilized, being indicated by the numeral 63. The ring 64 supports this electrode and is in turn retained by an arm 65 suspended from an insulator bushing 66 through which potential is supplied through electrode 63 from the transformer 67. This electrode may be formed of a relatively small rod-like member in which event the unsupported end will droop due to the weight thereof, as shown in Fig. 4. When, however, emulsion is being supplied through the nozzle 62, the axis of the electrode will tend to assume a horizontal position, shown in Fig. 5, due to the impact of the emulsion. In operation the electrode may assume a position intermediate that shown in Figs. 4 and 5, depending upon the size of the material of which the electrode is formed.

In this form of the invention the fields around the electrode 63 are bounded by the tank walls and by any body of water 69 in the lower portion of the tank.

Figure 6:
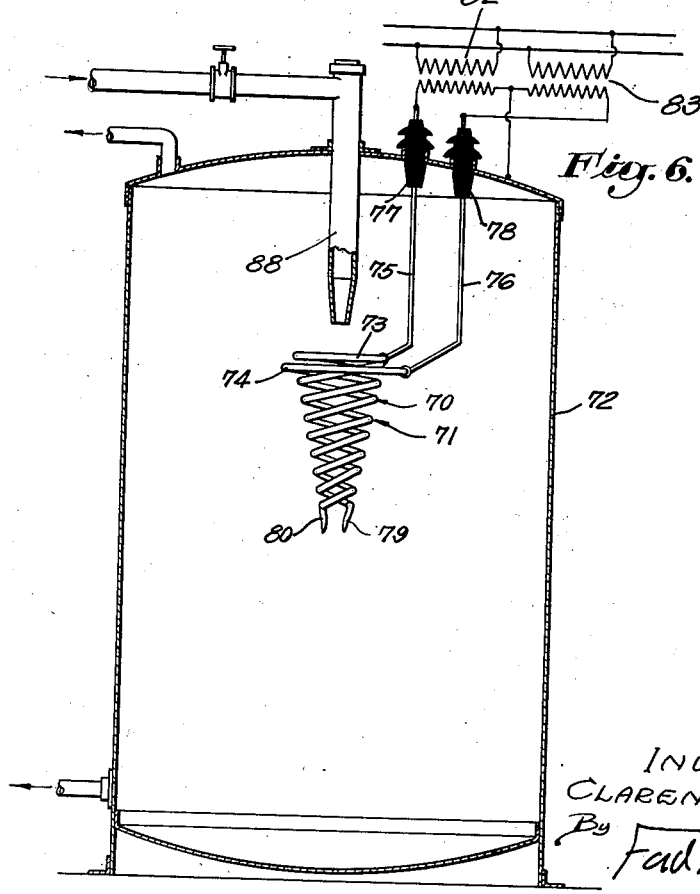
Fig. 6 diagrammatically illustrates a multiple-field form of the invention.

Fig. 6 illustrates still another form of the invention utilizing a dual-field system. Here primary and secondary electrodes 70 and 71 are positioned in a tank 72, being respectively supported by rings 73 and 74 mounted on arms 75 and 76. Bushings 77 and 78 insulate these electrode structures from each other and from the tank 72.

Each of these electrode structures 70 and 71 is in the form of an elongated coil spring, and preferably in the form of a tapered spring, as shown. The coils are disposed about a common axis, and, in the preferred embodiment, the coils of each electrode are interspaced with the coils of the other. One or both of the electrodes may provide a terminal portion if desired, these terminal portions being indicated by the numerals 79 and 80.

With this electrode structure it is preferable to maintain a potential difference between the electrodes 70 and 71 and also between each of these electrodes and the tank 72. This may be accomplished by any suitable potential supply means. As illustrated, this means includes a pair of transformers 82 and 83. The secondary windings of these transformers are connected in additive relation, one terminal of each being connected together and to the tank 72 by a conductor 84. The remaining high tension terminal of the transformer 82 is connected to the electrode 70 through the arm 75, while the remaining high tension terminal of the transformer 83 is similarly connected through the arm 76 to the electrode 71. When these transformers are energized an electric field is thus set up between the electrode 70 and the tank 72 and between the electrode 71 and the tank 72 in a manner previously described, these fields being respectively built up by the transformers 82 and 83. In addition thereto, extremely intense fields will be set up between the interspaced coils of the electrodes 70 and 71, for the potential difference between such coils will be equal to the sum of the potentials built up by the transformers 82 and 83. In its flow outward between these coils the emulsion is subjected to a very intense field, and is subsequently subjected to a field of lower intensity set up between each of these electrodes and the tank 72. In this form of the invention the electrodes 70 and 71 are made of a relatively rigid construction so that no material vibration of the electrodes will take place when the emulsion is introduced thereinto through a pipe 88.

However, in forming the electrodes shown in Figs. 1 to 4, inclusive, it is often desirable to make these electrodes of a resilient nature. This can be readily accomplished by using a relatively small rod-like member in forming these spring-shaped electrodes. As the incoming emulsion flows across the coils there is a tendency for these coils to be vibrated, the net result being that substantially the whole electrode is rapidly vibrated due to the impact of the emulsion. This has a very desirable action. In the first place it repeatedly shifts the position of the fields set up around each coil so that the effective area of these fields is greatly increased. Of necessity a high intensity field must be of relatively limited dimensions, but by setting up such a shaking or vibration of the electrode these dimensions are correspondingly increased, resulting in a more efficient treatment of the emulsion. In addition, the vibration of the electrode causes the lower terminal portion to vibrate, and thus greatly increases the effective treating area of the blast formed thereadjacent. This further increases the treating efficiency. Furthermore, if any low-resistance chains are formed through any of the electric fields set up in the treater, the vibration of the electrode will tend to break such chains. With the shape of the electrodes herein disclosed such chains are seldom formed unless an excessively wet material is being treated, or unless too much water is allowed to accumulate in the treater.

Another very desirable action of this vibration of the electrodes is to shake off any coalesced water which gathers around the coils. When an emulsion is subjected to a concentrated field it has been found that the water coalesces adjacent the smallest electrode. While it is entirely possible to operate the invention so that this coalesced water flows longitudinally along the coiled rod-like live electrode until it reaches the lower terminal portion and thus enters the electric blast, it is also possible to vibrate the electrode sufficiently so that the coalesced water is shaken therefrom. This is especially true when using an electrode in the form of a conical coil spring as shown in Fig. 1, for the water masses shaken from each coil can move directly downward therefrom without coming into contact with the coils therebeneath. A further advantage of thus shaking the water masses from the electrode is that when these masses leave the electrode surface they are necessarily charged with the charge existing on the electrode at that instant. Such a downward flow of charged water masses tends to facilitate coalescence.

Another desirable feature of the electrode structures herein disclosed is that they prevent the stream of emulsion discharged from the nozzle from moving entirely through the electrode without treatment.

Another very important action which takes place when an electrode of the elongated coil-spring type is used is that the emulsion in the tank tends to rotate therein about the axis of the nozzle. This is due to the screw-like nature of the electrode. It is often desirable to thus slowly circulate the emulsion circumferentially in the tank, and this is automatically accomplished by the use of the electrode structure of my invention.

One of the most important features of the present invention is the provision of a substantially equipotential space into which the emulsion is discharged before it is moved into the most intense portions of the field. So, also, a very important feature of the invention lies in the shape of the electrode structure which permits a much longer rod-like member to be utilized when this member is bent in the form of a coil. This is tantamount to results which might in part be produced by greatly increasing the length of a straight rod-like electrode if it were possible to use such a long and straight electrode in a dehydrator, which it is not. The expedient of forming the electrode in the form of a coil also results in greatly increasing the extent of the high intensity fields set up thereadjacent.

While the invention has been shown and described in conjunction with a process of treating emulsions of the water-in-oil type, it should be understood that it is not in all events limited to this use. Other types of emulsions and other types of suspensions may be satisfactorily treated.

I claim as my invention:

1. A method of treating an emulsion, which method includes the steps of: discharging a stream of emulsion into a substantially equipotential space; moving a stream of oil of higher dielectric strength than the emulsion into said equipotential space; mixing said emulsion and said liquid in said equipotential space; building up an electric field around said substantially equipotential space; moving the mixture of said emulsion and said oil from said substantially equipotential space at a plurality of points and into said electric field wherein the dispersed phase of said emulsion agglomerates; and removing the constituents of said emulsion from said electric field.

2. A method of treating an emulsion by the use of a coil-shaped electrode, which method includes the steps of: building up an electric field outside said coil-shaped electrode; introducing a stream of emulsion into the substantially equipotential space inside said coil-shaped electrode whereby said emulsion flows outward through said coil-shaped electrode and into said electric field; and removing the treated constituents of said emulsion from said field.

3. In combination in an electric treater for treating emulsions: a tank containing in one end thereof dry oil comprising a dielectric liquid of higher dielectric strength than the emulsion to be treated; a live interstitial electrode providing an open end communicating with said dielectric liquid and defining a substantially equipotential space therein; means for flowing a stream of emulsion into said substantially equipotential space through said open end, said stream drawing dielectric liquid into said open end to mix therewith in said equipotential space; and means around said interstitial electrode for setting up an electric field therearound, said mixture of said emulsion and said dielectric liquid flowing from said substantially equipotential space through the interstices of said interstitial electrode and into said electric field.

4. In combination in an electric treater for treating emulsions: an electrode in the shape of an elongated coil spring; discharge means for directing a stream of emulsion into the space inside said electrode whereby said emulsion flows outward through the spaces between the coils of said electrode; and means for setting up an electric field around said electrode and into which field said emulsion flows.

5. A combination as defined in claim 4 in which said electrode is in the form of a conical coil spring.

6. In combination in an electric treater for treating emulsions: an electrode in the shape of an elongated coil spring; means for mounting only one end of said electrode, the other end of said electrode being free to move; means for establishing an electric field around said electrode; and means for setting said electrode into vibration, said means including means for directing a stream of the emulsion to be treated into contact with said electrode to vibrate said electrode at a rapid rate.

7. In combination in an electric treater for treating emulsions: a tank; a ring supported in said tank; an electrode in the shape of an elongated coil spring depending from said ring; discharge means for directing a stream of emulsion into said electrode whereby said emulsion flows outward through the spaces between the coils of said electrode; and means for setting up an electric field around said electrode and into which field said emulsion flows.

8. In combination in an electric treater for treating emulsions: a tank; a live electrode insulated from said tank and in the form of an elongated coil spring, the interior of said live electrode providing a substantially equipotential space; a discharge means directing emulsion to be treated into said equipotential space; potential supply means electrically connected to said live electrode and said tank for building up an electric field therebetween, said field being relatively more concentrated adjacent the surface of said live electrode than adjacent said tank due to the smaller surface area of said central electrode, said emulsion flowing from said substantially equipotential space between the coils of said live electrode and into the most intense portion of said field whereby the dispersed phase of said emulsion is coalesced; and means for withdrawing the constituents of said emulsion from said tank.

9. In combination in an electric treater for treating emulsions of oil and water: a tank containing a body of water in the lower end thereof; a live electrode supported in said tank and providing a substantially equipotential space therein open at its upper end; grounded means for introducing a stream of emulsion to be treated into said substantially equipotential space, said emulsion flowing downward therein; a terminal portion depending from said live electrode in alignment with said downwardly-moving emulsion; means for establishing a potential difference between said terminal portion and said body of water to set up an electric blast of high intensity from said terminal portion and exerting a treating action on any emulsion coming into the vicinity thereof to coalesce the dispersed phase of said emulsion whereby the water and the oil phases of said emulsion separate in said tank, said water phase entering said body of water; means for withdrawing oil from the top of said tank; and means for withdrawing water from the bottom of said tank.

10. In combination in an electric treater for treating emulsions of oil and water: a tank containing a body of dry oil in its upper end; a live electrode supported in said tank and providing a vertically disposed substantially equipotential space open at its upper end, the upper end of said electrode being surrounded by dry oil in the upper part of said tank; a discharge means for moving emulsion downwardly into said substantially equipotential space, said discharge means being insulated from said live electrode and electrically connected to said tank; and means for establishing a potential difference between said live electrode and said tank thereby setting up a main electric field therebetween and an auxiliary electric field between said discharge means and said live electrode, the dry oil surrounding the upper end of said live electrode preventing excessive current flow across said auxiliary field, said main field treating said emulsion after it flows from said substantially equipotential space.

11. In combination in an electric treater for treating emulsions: a tank; a live electrode insulated from said tank and in the form of an elongated coil spring, the interior of said live electrode providing a substantially equipotential space and the lowermost portion of said live electrode forming a downwardly-directed terminal portion; discharge means directing emulsion into said substantially equipotential space toward said terminal portion; means for establishing a potential difference between said live electrode and a body of water in the lower portion of said tank whereby an electric blast is formed from said terminal portion to said body of water; means for withdrawing oil from the top of said tank; and means for withdrawing water from said body of water in the lower end of said tank.

12. In combination in an electric treater for treating emulsions: a tank; a pair of live electrodes each in the shape of an elongated coil spring, said electrodes being positioned about a common axis; means for flowing a stream of emulsion along said axis whereby said emulsion moves through the spaces between the coils of said live electrodes and into the space between said tank and said live electrodes; means for insulating said live electrodes from each other and from said tank; and means for setting up potential differences between said live electrodes and between each of said live electrodes and said tank.

13. In an electric treater for treating emulsions: a relatively long member providing a point at one end and a relatively sharp terminal portion at the other end; a nozzle in axial alignment with said point and directing a stream of emulsion theretoward, said point piercing said stream whereby said emulsion flows along said member into the zone adjacent said relatively sharp terminal portion; and means for setting up an intense electric blast from said relatively sharp terminal portion and treating the emulsion entering said zone.

14. In combination in an electric treater for treating emulsions: an outer electrode containing the emulsion to be treated; an inner electrode in said outer electrode and in the form of a relatively small member having a small radius of curvature; means for insulating said inner and outer electrodes from each other; means for establishing a potential difference between said electrodes to establish therebetween an electric field which is highly concentrated adjacent said inner electrode due to the difference in sizes of said electrodes and the small radius of curvature of the surface of said inner electrode whereby the high field-intensity zone immediately around said inner electrode coalesces the dispersed phase of said emulsion in said zone; and means for rapidly vibrating said inner electrode to increase the effective area of said high field-intensity zone and to shake from said inner electrode the coalesced particles.

15. In combination in an electric treater for treating emulsions: a pair of spaced electrodes each in the shape of an elongated coil spring including a plurality of coils, said electrodes being positioned about a common axis; means for establishing a potential difference between said electrodes whereby fields are established between adjacent coils of the two electrodes; and means for flowing an emulsion to be treated through said fields.

16. A combination as defined in claim 15 in which the coils of one electrode are interspaced with the coils of the other electrode.

17. A combination as defined in claim 15 in which the coils of each electrode progressively decrease in radius toward one end thereof.

18. In combination in an electric treater for emulsions: a tank containing emulsion and retaining a body of water in one end thereof; a central live electrode in said tank and insulated therefrom and providing a substantially equipotential space therein and providing one or more spaces through which said equipotential space communicates with the emulsion outside said central live electrode, one end of said central live electrode providing a vertically-extending terminal portion spaced from said body of water; said one or more spaces being positioned at an elevation above said terminal portion; and means for establishing electric fields between said live central electrode and said tank and between said terminal portion and said body of water, said last-mentioned field being in the nature of an intense electric blast directed toward said body of water, at least a portion of the liquid in said equipotential space moving downward therefrom and into said intense electric blast.

19. A method of electrically treating by the use of an electrode defining a substantially equipotential space, which method includes the steps of: surrounding said electrode with a liquid comprising an oil-water mixture, the water content of said mixture being progressively less toward the upper end of said electrode; drawing a portion of said liquid from the zone around said electrode into an upper portion of said electrode and thus into said substantially equipotential space therein; establishing an intense electric blast from the lower end of said electrode; and moving in a downward direction in said equipotential space at least a portion of the liquid drawn into said substantially equipotential space, said portion moving from this space and into said electric blast.

20. A method of treating an emulsion containing constituents including water forming the dispersed phase and a dielectric liquid forming the continuous phase by the use of an electrode defining a substantially equipotential space, which method includes the steps of: electrically treating said emulsion in a zone outside said equipotential space to coalesce the water droplets whereby these coalesced droplets tend to separate from the dielectric liquid leaving at one end of said electrode a body of liquid of higher dielectric strength than the emulsion to be treated; drawing into said equipotential space a portion of said liquid of higher dielectric strength than said emulsion to be treated; moving at least a portion of this liquid through said equipotential space and from said equipotential space at a position at the other end of said electrode; and establishing an intense electric blast at said other end of said electrode and into which moves the liquid leaving said equipotential space.

21. In combination in an electric treater for treating emulsions: an interstitial electrode structure providing an open end and defining a substantially equipotential space therein; means for flowing a stream of emulsion into said substantially equipotential space through said open end; an emulsion spreader in said substantially equipotential space for spreading the emulsion entering therein to cause said emulsion to flow from said equipotential space through the interstices of said interstitial electrode; and means around said interstitial electrode for setting up an electric field therearound, said emulsion flowing from said substantially equipotential space through the interstices of said interstitial electrode and into said electric field.

22. In combination in an electric treater for emulsions: a tank containing emulsion; an electrode means in said tank and including a relatively sharp terminal portion and a resilient means extending away from said terminal portion to resiliently support same; means for establishing a relatively intense electric blast adjacent said terminal portion and in the emulsion to be treated thereby; and means for increasing the zone of effectiveness of said blast and including means for vibrating said terminal portion to change its position in the space inside said tank, thereby rapidly shifting said blast to sweep out an effective zone much larger than if said blast was retained in fixed position.

CLAR